Feb. 6, 1940.　　　I. F. McDONALD　　　2,189,217

DOUGHNUT MAKING APPARATUS

Filed April 23, 1934　　　3 Sheets-Sheet 1

INVENTOR
IRVIN F. MCDONALD
BY William E. Hall
ATTORNEY.

Feb. 6, 1940.　　　I. F. McDONALD　　　2,189,217

DOUGHNUT MAKING APPARATUS

Filed April 23, 1934　　　3 Sheets-Sheet 2

INVENTOR
IRVIN F. McDONALD
BY
William B. Hall
ATTORNEY.

Feb. 6, 1940.  I. F. McDONALD  2,189,217
DOUGHNUT MAKING APPARATUS
Filed April 23, 1934  3 Sheets-Sheet 3
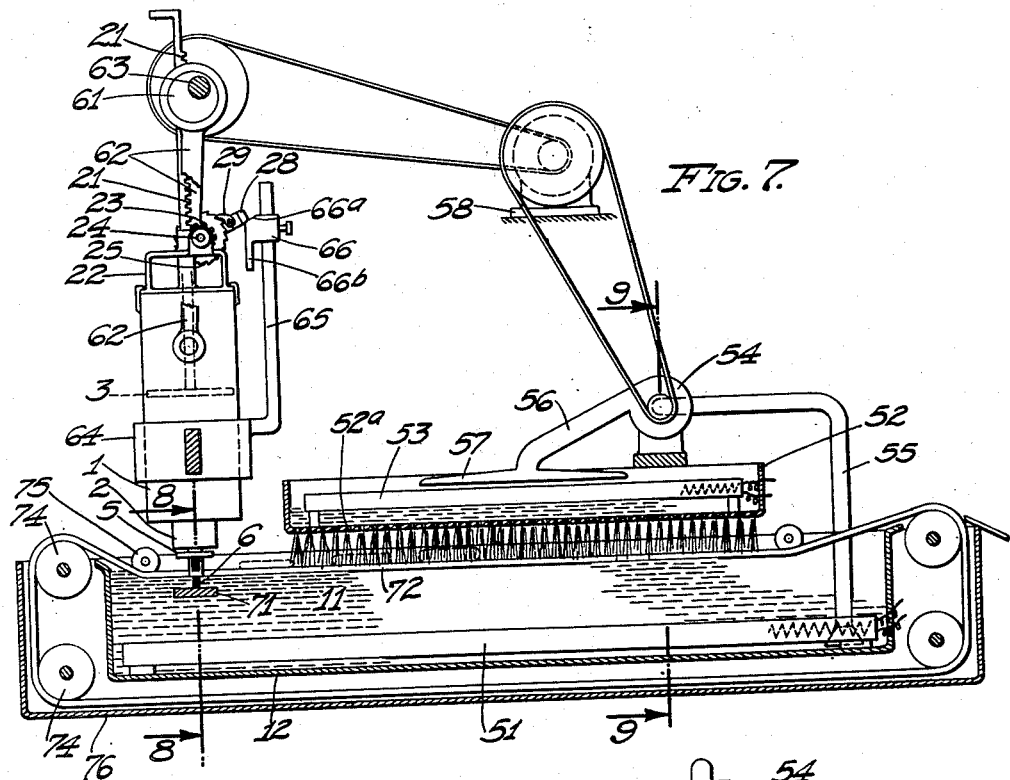
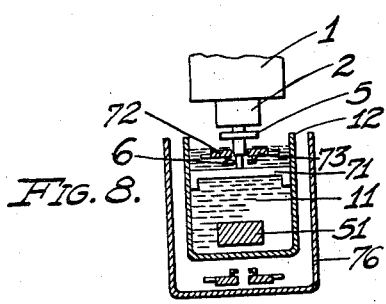
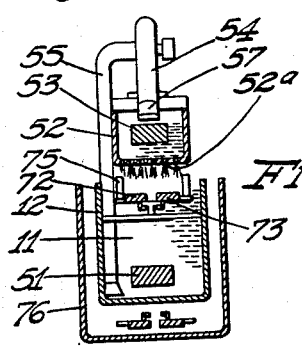
INVENTOR
IRVIN F. McDONALD
BY
ATTORNEY.

Patented Feb. 6, 1940

2,189,217

UNITED STATES PATENT OFFICE 2,189,217

DOUGHNUT MAKING APPARATUS

Irvin F. McDonald, Los Angeles, Calif.

Application April 23, 1934, Serial No. 721,955

7 Claims. (Cl. 107—14)

My present invention relates to an apparatus or machine for making doughnuts, or the like.

The objects of my invention are:

First, to provide an apparatus of this class whereby the freshly formed dough of doughnuts, or other product, is cut, clipped, or formed, and laid gently upon a conveyor, or upon hot grease, or other liquid, by the engagement of the cutter of the apparatus with suitable means in connection with the conveyor or near or immediately below the surface of the grease, or other liquid;

Second, to provide such an apparatus whereby the cutter may be easily adjusted so that the cutting or similar operation may always be effected adjacent the top of the conveyor or the surface of the grease, or other liquid, even though the level of the latter varies considerably; that is, such an apparatus which is readily accommodated to varying heights of grease, or other liquid, or other surface upon which the doughnuts, or other products, are laid;

Third, to provide an apparatus of this class in which the doughnut, or the like, is formed and cut by raising and lowering the whole container, containing the product from which it is made, against a suitable obstruction;

Fourth, to provide an apparatus of this class in which dough, or the like, is forced from the container without agitating the contents in any way, and thus preserving the texture thereof;

Fifth, to provide novel means for producing such pressure in the dough container, or other container, so that varying and desired quantities of dough, or the like, may be forced from the container;

Sixth, to provide an apparatus of this class in which the foregoing features may be embodied in a manually operated or automatic machine;

Seventh, to provide an apparatus embodying the foregoing features and so made that doughnuts, or the like, may be formed or cut with one hand;

Eighth, to provide an apparatus of this class whereby the discharge means may be readily replaced so that either ordinary doughnuts or French doughnuts may be made;

Ninth, to provide a novel doughnut machine whereby the doughnuts are fried on both sides without turning them over in the grease;

And tenth, to provide as a whole a novelly constructed apparatus of this class, one which is simple and economical of construction and of operation, and which will not readily get out of order.

With these and other objects in view, I have devised a doughnut making apparatus as will be hereinafter described in detail and particularly set forth in the appended claims, reference being had to the accompanying drawings and to the characters of reference thereon, which form a part of this application, in which:

Figure 6:
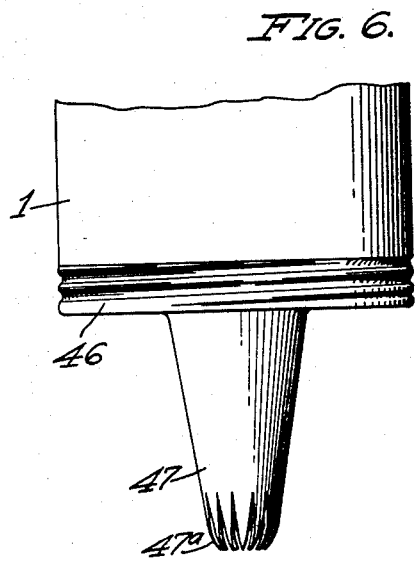

Fig. 6 is a fragmentary elevation thereof in which a spout or nozzle is attached for making French doughnuts, or the like, Fig. 7 is an elevational view, partly in section, of an automatic machine embodying my invention, and showing means for frying both sides of the doughnuts; and, Figs. 8 and 9 are sectional views, taken respectively through 8—8 and 9—9 of Fig. 7.

Figure 1:
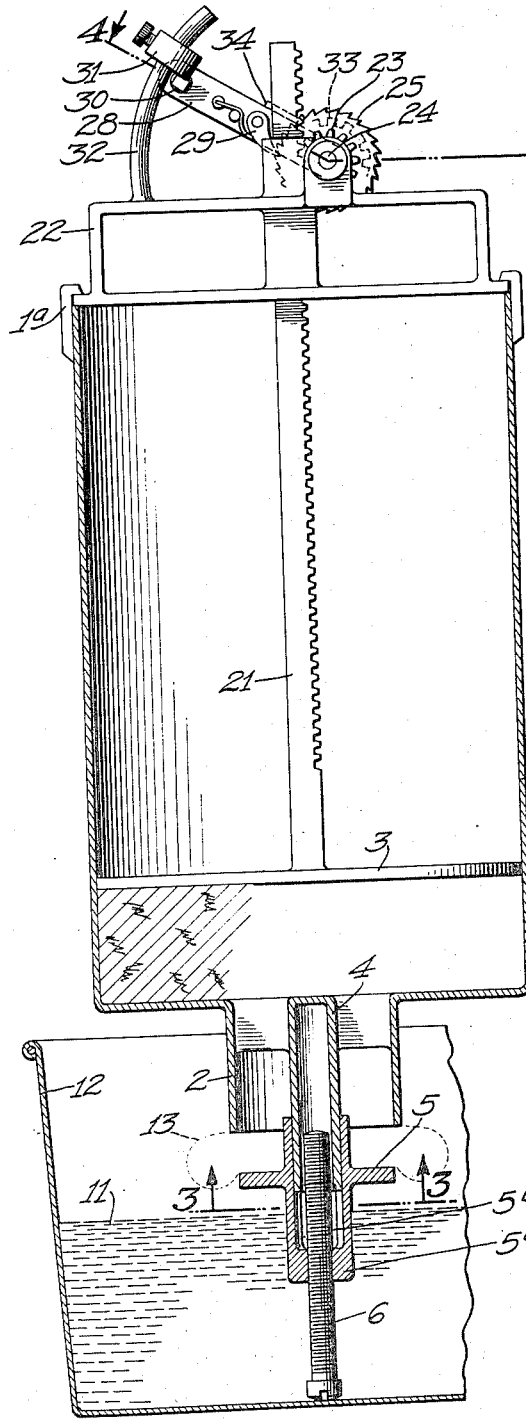
Fig. 1 is a longitudinal section of my apparatus in one form for making doughnuts, the feed means being shown in elevation.
Figure 4:
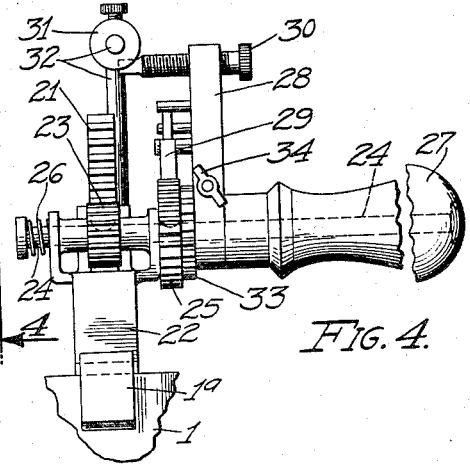
Fig. 4 is a fragmentary elevational view of the pressure producing means, taken substantially at 4—4 of Fig. 1.
Figure 2:
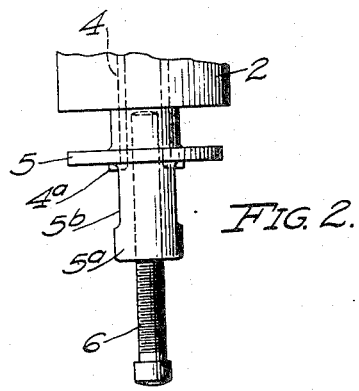
Fig. 2 is a fragmentary side view of a detail of the dough cutter.
Figure 3:
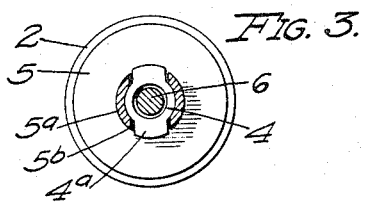
Fig. 3 is a transverse sectional view taken at 3—3 of Fig. 1.

In the apparatus shown in Fig. 1, the container 1, for holding the dough or other product, is a cylinder, the lower end of which is provided with a large, downwardly extending spout 2. In the cylinder is reciprocally mounted a plunger 3 for forcing the product through the spout. Rigidly mounted at the axial portion of the spout is a tube 4, closed at the inner end, on which is reciprocally mounted the cutter 5 which is in the form of a disc having a downwardly depending shank 5a with longitudinal slots 5b at the opposite sides. Through these slots project laterally extending lugs 4a for limiting the downward position of the cutter. In the lower end of the shank and coaxial therewith is a long finger in the form of an adjusting screw 6, which extends freely into the tube 4. This screw is adjusted in or out depending upon the height of the liquid 11 in the receptacle 12, so that the formed doughnut 13 will be cut from the body within the container only a slight distance above the surface of the grease or other liquid.

The plunger 3 has a stem 21 in the form of a gear rack which extends outwardly through a frame 22 which is readily attached to the end of the cylinder by placing its diametrically opposite ends behind retaining ears 1a. On the frame is mounted a pinion 23 which meshes with the rack. Coaxial with the pinion, and secured to the same shaft 24, is a ratchet 25. The shaft is prevented from free rotation by a spring 26. Freely rotatable on the shaft is a handle 27 which has a laterally extended portion 28 on which is mounted a pawl 29 which is adapted to engage the ratchet and rotate the shaft in one direction only. At the outer end of the portion 28 is a stop which may be in the form of a screw 30. The handle portion 28 is adapted to oscillate through an arc, limited by the engagement of the inner end of the screw 30 with the frame 22, at one end, and by the stop collar 31, at the other end of the arc. This collar is adjustably mounted on an arcuate support 32 carried by the frame.

The container is supported by the handle 27 which is rotated clockwise as the container is lowered, until the screw 30 engages the frame. This forces a portion of the product from the spout until it assumes a shape shown by dotted lines designated 13, in Fig. 1. As the device is lowered into the grease and the lower end of the screw 6 strikes the bottom of, or a platform in, the receptacle 12, the doughnut is cut off and dropped into the grease. This arrangement permits doughnuts to be made with one hand.

Coaxial with the ratchet, and preferably secured thereto, is a clutch or serrated disc 33 into the notches of which is adapted to extend a pawl 34 for locking the handle to the shaft and permit the handle to be rotated counter-clockwise, thereby raising the plunger when the stop screw 30 is withdrawn.

Figure 5:
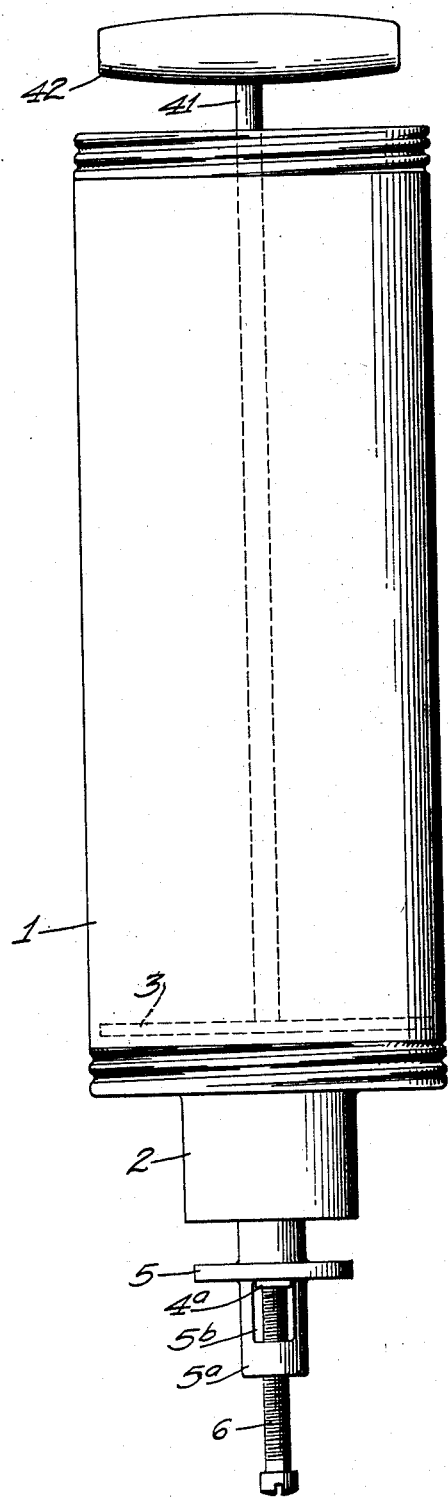
Fig. 5 is an elevational view of my apparatus in a slightly modified form, in which the feed mechanism is omitted.

In the structure shown in Fig. 5, an ordinary cylinder and plunger is employed. The plunger, designated 3, is reciprocated by a stem 41 and a handle 42 at the outer end of the stem.

In this instance the spout and cutting means are mounted on a head which is screwed on one end of the cylinder 1. This permits the spout to be readily removed and another spout or nozzle screwed in its place, as shown in Fig. 6. Fig. 6 shows a head member 46 which is screwed on one end of the cylinder. This head is provided with a nozzle 47 terminating in a relatively small opening. This opening is formed with converging prongs 47a such as are used in making French doughnuts. This form of nozzle may also be used for making cookies, decorations, and the like.

In Fig. 7, I have shown my apparatus embodied in an automatic machine. In this machine, the receptacle 12 is preferably a long narrow one having an electric heating unit 51 for heating the grease. Above the receptacle is mounted a shallow tray 52 having many perforations 52a in its bottom, which is positioned near the top of the receptacle 12 and the surface of the grease therein. In the tray is also provided an electric heating unit 53. A pump 54, positioned above the receptacle, has its suction 55 at one end and near the bottom of the receptacle, and its discharge 56 connected with a long distributing head 57 at the top of the tray 52. This pump takes the grease from one end of the receptacle, setting up a flow toward said end, and delivers it to the tray, which in turn discharges it in the form of a relatively fine spray over the surface of the grease in the receptacle. Thus the doughnuts are fried on both sides without being turned over.

The pump is driven by a motor 58, which also operates the doughnut forming mechanism, as will be described hereafter.

The container 1 is vertically reciprocated, being suspended from and connected to eccentrics 61 by connecting rods 62, the eccentrics being mounted on a shaft 63 rotated by the motor. The container is guided by a guide 64 which is provided at one side with an upwardly extending support 65. On this support is vertically adjustably mounted a cam 66 which is adapted to be engaged by and to control the movement of the arm 28 on which the pawl 29 is mounted. The cam is provided with an inclined surface 66a, at the upper side and at the side adjacent the arm 28 and the ratchet, and is also provided with an apron 66b against which the arm may slide, when leaving the inclined surface, without rotating the ratchet.

The finger or screw 6 is adapted preferably to engage a platform 71 when the container is lowered to cut off a formed doughnut. The platform is positioned below the surface of the grease in the receptacle.

In the receptacle is also mounted a conveyor which, in this instance, consists of slightly spaced apart conveyor belts 72 and 73, the belts being separated to permit the finger or screw 6 to extend therebetween and engage the platform. This conveyor extends around four sprockets 74 and under idlers 75, which idlers direct the conveyor to pass below the surface of the grease from the feed to the discharge end. The sprockets 74 may be mounted in a second receptacle 76 so that only the portion of the conveyor, between the idlers, passes through the grease. This conveyor tends more positively to feed the doughnuts toward the discharge end of the receptacle.

Though I have shown and described a particular construction and certain applications and modifications thereof, I do not wish to be limited to these, but desire to include in the scope of my invention the construction, combination, and arrangement, substantially as set forth in the appended claims.

I claim:

1. In an apparatus of the class described, a container having a discharge spout at its lower end, a cutter mounted at the lower end of said spout, means engageable with a foreign object for moving the cutter with respect to the spout, means for suspending the container and raising and lowering the same, a plunger reciprocally mounted in said container and having a gear rack extending upwardly and from the container, a pinion engaging the rack, a ratchet for rotating the pinion, a pawl for rotating the ratchet and operatively connected with the suspending means for moving the pawl by manipulation of the suspending means, and adjustable stop means for controlling the rotation of the ratchet and thereby limiting the movement of the plunger.

2. In an apparatus of the class described, a container having a discharge spout at its lower end, a cutter mounted at the lower end of said spout and movable with respect thereto when lowered against a foreign object, a handle at the upper portion of the container and mounted to rotate about its longitudinal axis and transverse to the axis of the container for raising and lowering the container, a plunger reciprocally mounted in said container and having a gear rack extending upwardly and from the container, a pinion engaging the rack, a ratchet for rotating the pinion, a pawl for rotating the ratchet and operatively connected and rotatable with the handle.

3. In an apparatus of the class described, a container having a discharge, a rotatable handle for supporting and raising and lowering said container, said handle being mounted to rotate about its longitudinal axis, and a means for creating periodic pressure within the container, comprising a plunger reciprocally mounted within the container and having a gear rack extending therefrom, a pinion engaging the rack, a ratchet for rotating the pinion, and a pawl for rotating the ratchet and operatively connected to and rotatable with the handle about said longitudinal axis.

4. In an apparatus of the class described, a container having a discharge, a rotatable handle for supporting and raising and lowering said container, said handle being mounted to rotate about its longitudinal axis, and a means for creating periodic pressure within the container and having a stem extending therefrom, a ratchet for intermittently advancing said stem, and a pawl for rotating the ratchet and operatively connected to and rotatable with the handle about said longitudinal axis.

5. In an apparatus of the class described, a container having a discharge spout at its lower end and a tubular fixed guide positioned centrally of the spout and extending downwardly with respect to the container, and a cutter reciprocally mounted to slide exteriorly of and on the lower end of the guide and adapted to be raised contiguous to the spout and cut off the portion of the product discharge from the spout.

6. In an apparatus of the class described, a container having a discharge spout at its lower end and a guide positioned centrally of the spout and extending downwardly and below the spout, and a cutter mounted on and adapted to reciprocate longitudinally on the outside of the guide and adapted to be raised contiguous to the spout and cut off the portion of the product discharge from the spout.

7. In an apparatus of the class described, a container having a discharge spout at its lower end, a tubular guide positioned centrally of the spout and extending downwardly beyond the spout, the inner end of the tubular guide being closed, a disc shaped cutter mounted on and adapted to reciprocate longitudinally on the tubular guide, said cutter having a central depending yoke, and an actuating member adjustably mounted on and depending from the lower end of the yoke, and coaxial with and adapted to enter the tubular guide, said cutter being adapted to be raised contiguous to the spout and cut off the portion of the product discharged from the spout.

IRVIN F. McDONALD.